(12) United States Patent
Hanano

(10) Patent No.: US 6,690,346 B1
(45) Date of Patent: Feb. 10, 2004

(54) IMAGE DISPLAY

(75) Inventor: Kazunari Hanano, Hachioji (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 09/290,963

(22) Filed: Apr. 13, 1999

(30) Foreign Application Priority Data

Apr. 13, 1998 (JP) .......................................... 10-100741

(51) Int. Cl.⁷ ................................................. G09G 3/36
(52) U.S. Cl. ........................... 345/98; 345/99; 345/100; 345/104; 348/766; 348/767; 359/303; 359/495; 359/497
(58) Field of Search ............................ 345/98, 99, 100, 345/104; 348/759, 795, 762, 766, 767; 359/495, 303, 497, 53, 63

(56) References Cited

U.S. PATENT DOCUMENTS

| | | | |
|---|---|---|---|
| 5,347,294 A | * | 9/1994 | Usui et al. ...................... 345/89 |
| 6,061,103 A | * | 5/2000 | Okamora et al. ............ 348/767 |
| 6,104,446 A | * | 8/2000 | Blankenbecler et al. ....... 349/5 |
| 6,115,084 A | * | 9/2000 | Miyashita et al. ........... 348/792 |
| 6,121,950 A | * | 9/2000 | Zavracky et al. .............. 345/98 |
| 6,163,349 A | * | 12/2000 | Nakanishi et al. .............. 349/5 |
| 6,184,969 B1 | * | 2/2001 | Fergason .................... 349/196 |
| 6,429,415 B1 | * | 8/2002 | Rhoads .................... 250/208.1 |
| 6,460,155 B1 | * | 10/2002 | Nagasaki et al. ............ 714/752 |

FOREIGN PATENT DOCUMENTS

| | | |
|---|---|---|
| EP | 0 606 182 A2 | 1/1994 |
| EP | 0 831 353 A1 | 3/1998 |
| JP | 6-324320 | 11/1994 |

OTHER PUBLICATIONS

Office Action issued by the European Patent Office on Mar. 24, 2003 against application No. 99 106 227.4–2202.

* cited by examiner

*Primary Examiner*—Richard Hjerpe
*Assistant Examiner*—Abbas Abdulselam
(74) *Attorney, Agent, or Firm*—Ostrolenk, Faber, Gerb & Soffen, LLP

(57) ABSTRACT

An image display capable of effectively preventing deterioration of the contrast and permitting sufficient resolution improvement to be obtained by wobbling is disclosed. A display element 1 has a display surface with a regular array of a plurality of pixels. A vibrating means 2, 3 or 21 vibrates the optical axis of the light beam emitted from the display surface in predetermined directions. An image display control means 11 causes display of different images on the display element 1 in synchronism to vibrations of the optical axis caused by the vibrating means. The vibrating means includes a polarization conversion control means 2 and 22 to 25 capable of controlling the polarization conversion timing.

28 Claims, 16 Drawing Sheets

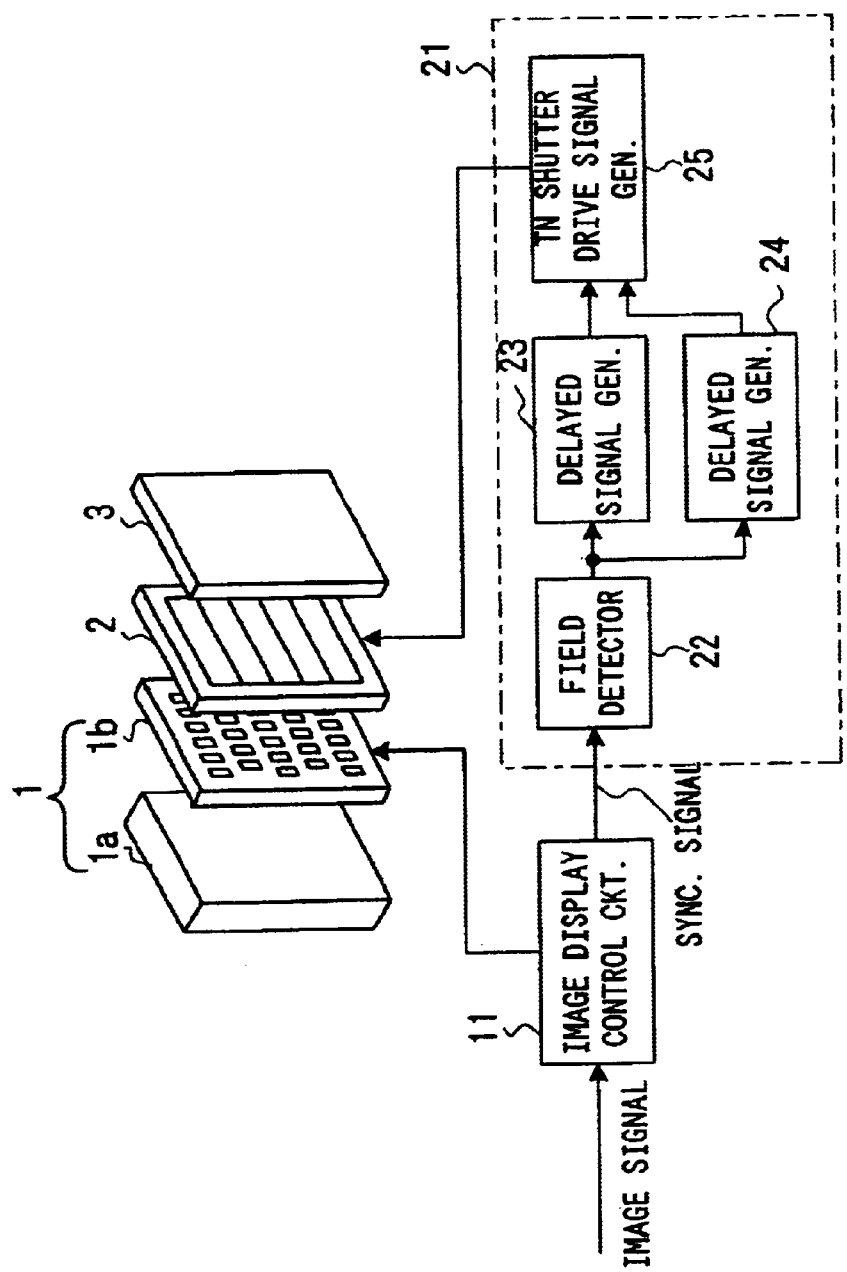

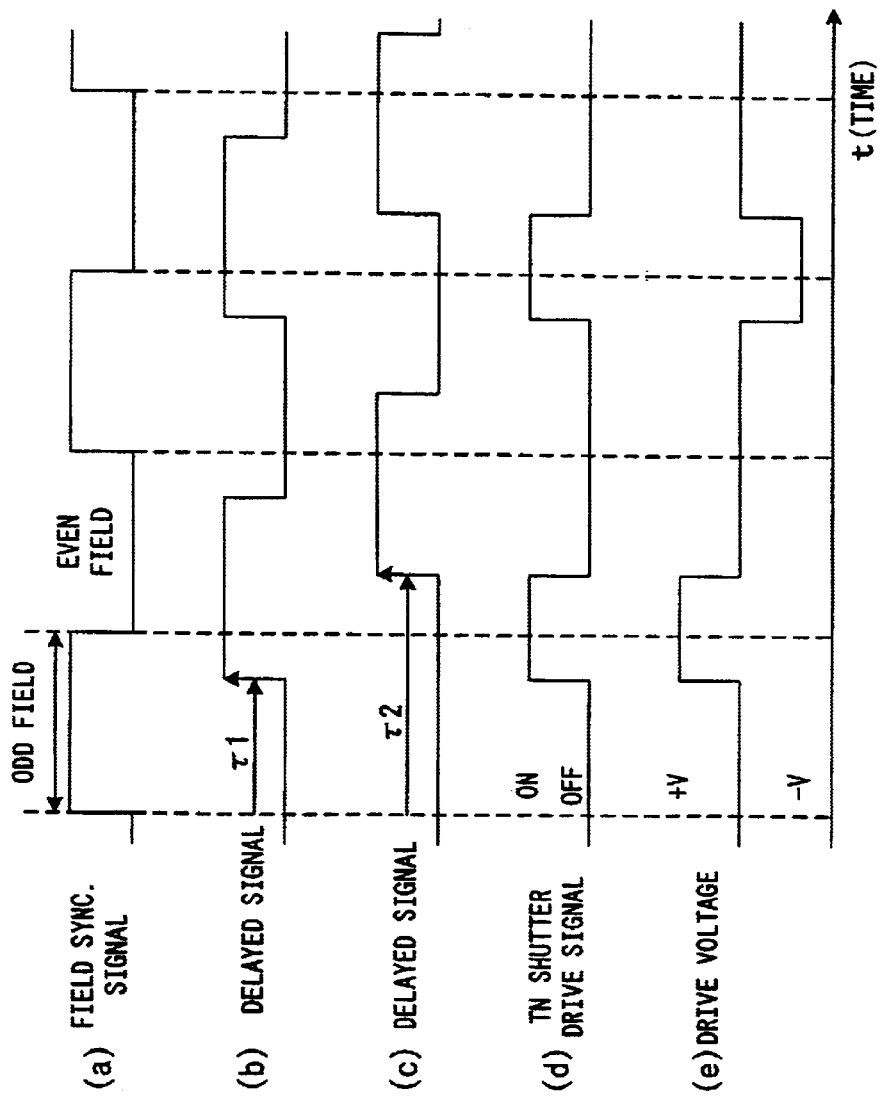

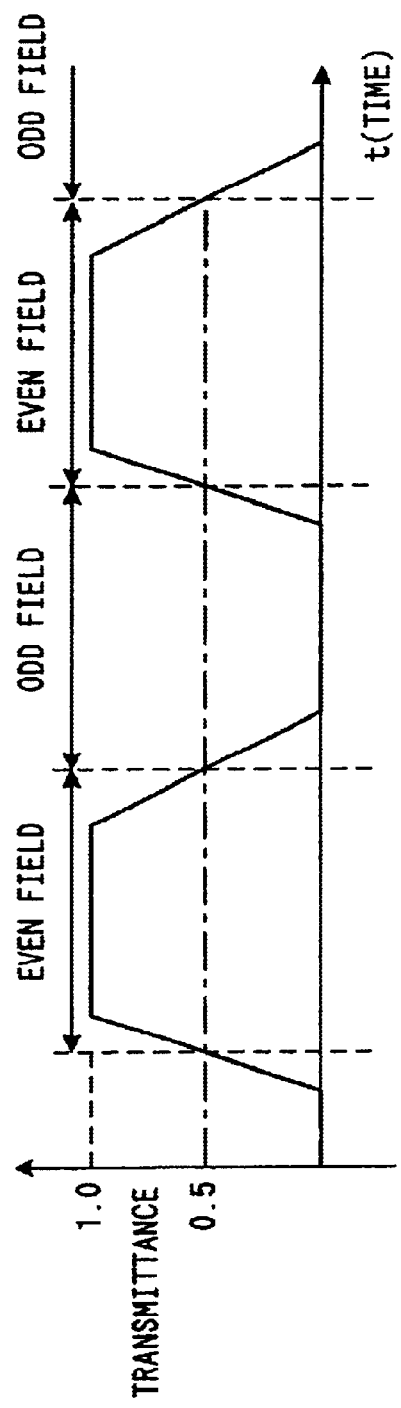
FIG.3(a) TRANSMITTANCE
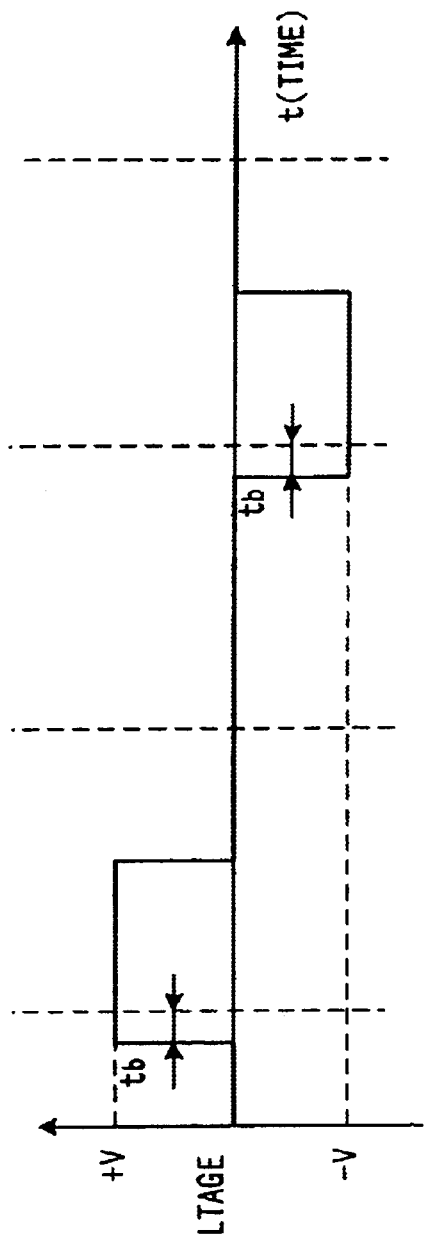
FIG.3(b) DRIVE VOLTAGE

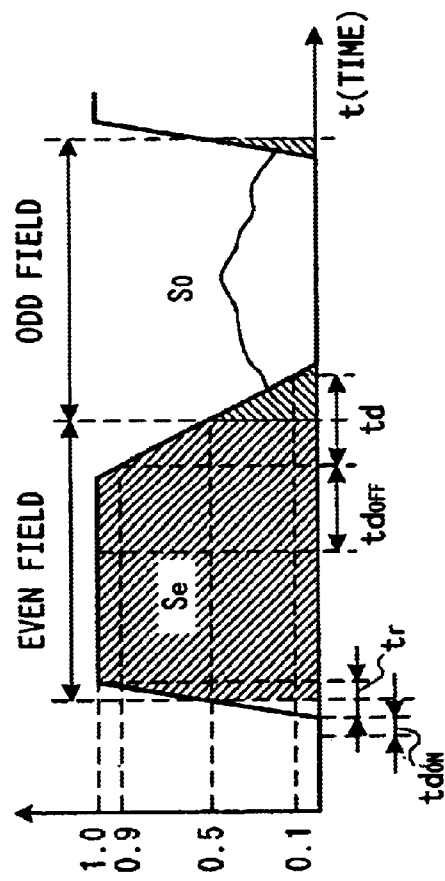
FIG. 4 (a) TRANSMITTANCE
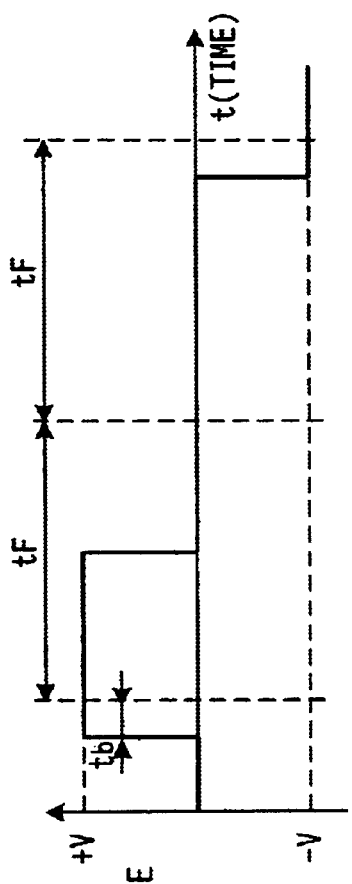
FIG. 4 (b) DRIVE VOLTAGE

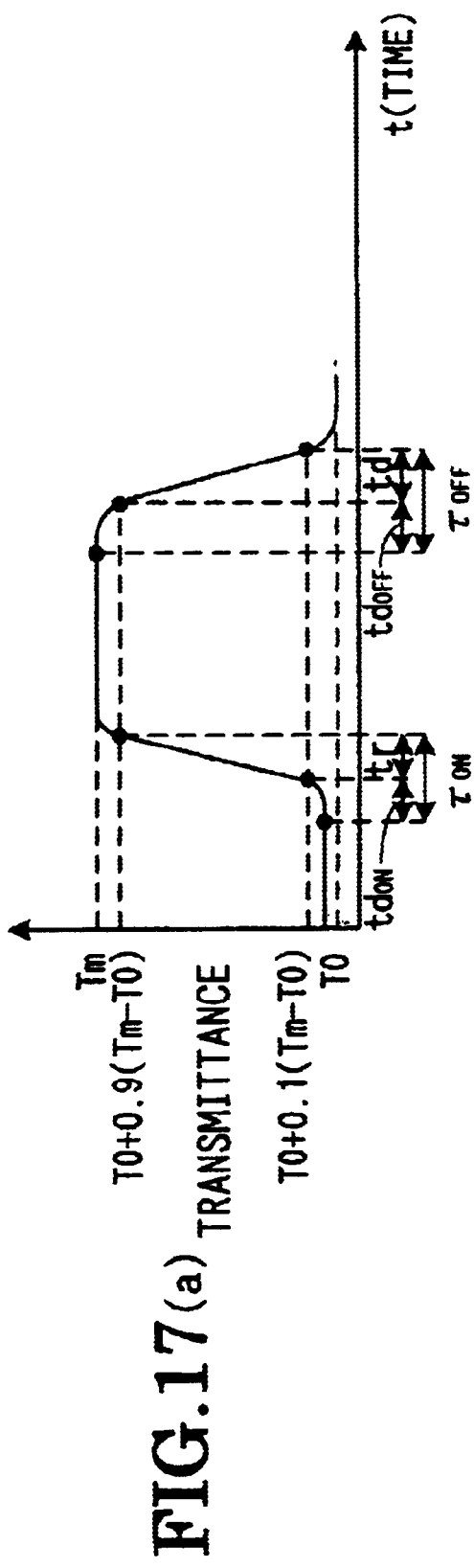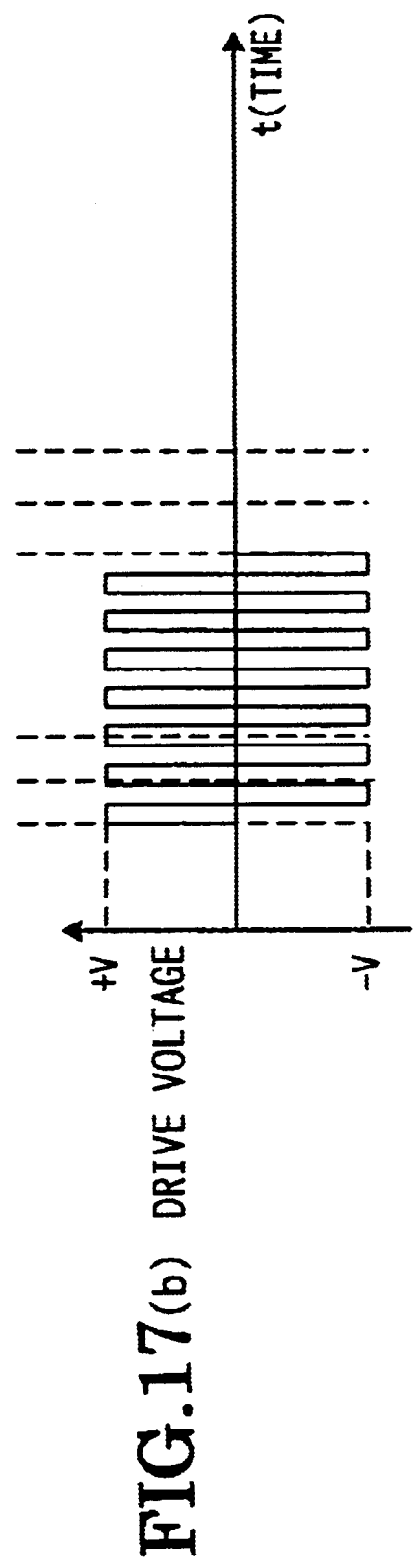
FIG.17(a) TRANSMITTANCE
FIG.17(b) DRIVE VOLTAGE

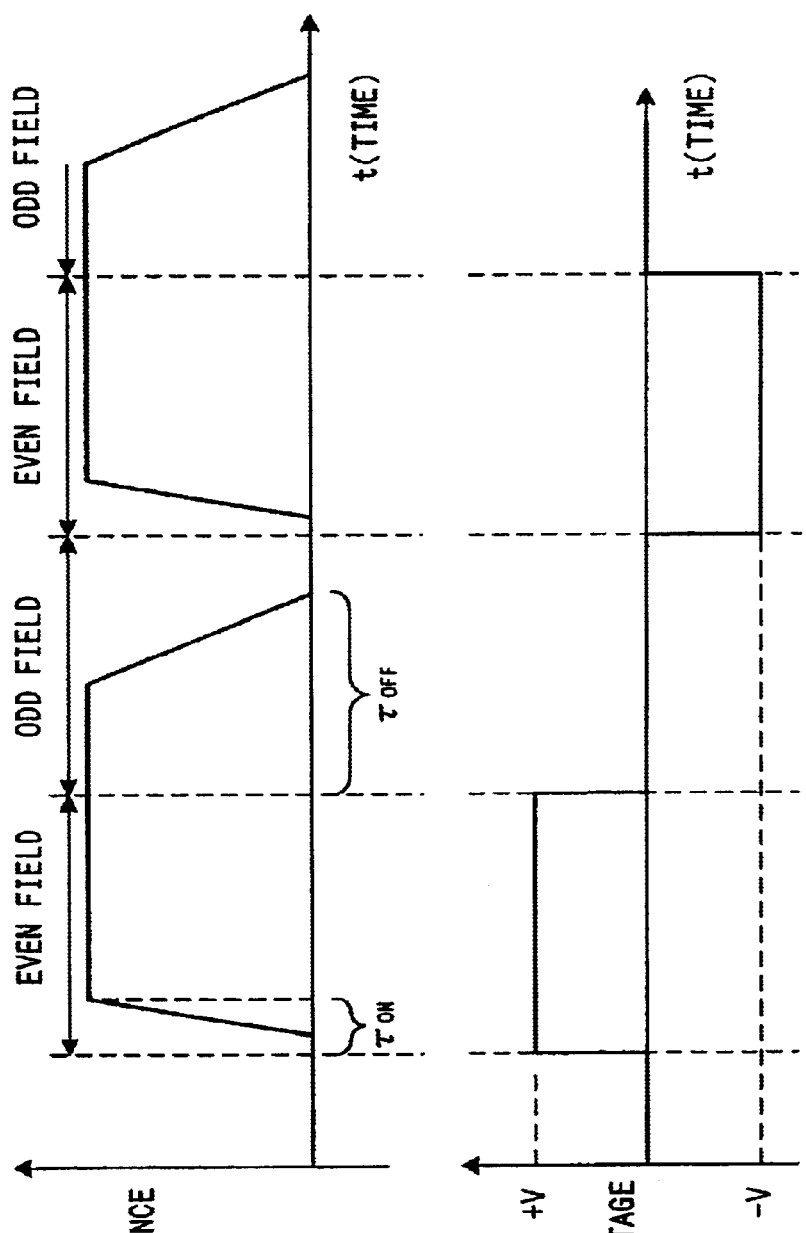
FIG. 18(a) TRANSMITTANCE
FIG. 18(b) DRIVE VOLTAGE

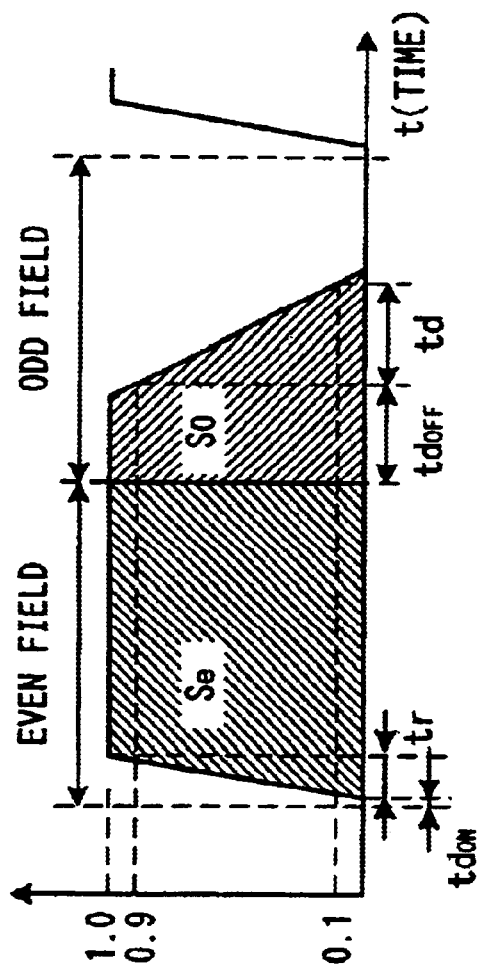
FIG. 20(a) TRANSMITTANCE
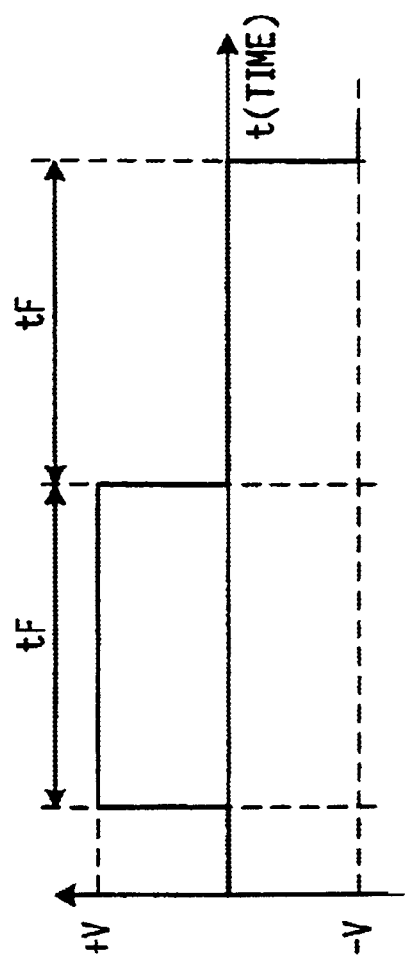
FIG. 20(b) DRIVE VOLTAGE

IMAGE DISPLAY

BACKGROUND OF THE INVENTION

The present invention relates to an image display for displaying images with image shift by wobbling.

Japanese Patent Disclosure No. 6-324320 discloses an image display, which comprises a shifting means disposed on an optical path between a display element having a discrete pixel array and an observing position for shifting the optical axis of light emitted from the display element in predetermined directions. In this display, odd and even field images are successively written in the same pixel of the display element for display, and in synchronism to the fields the shifting means shifts the optical axis of light emitted from the display element in predetermined directions, that is, shifts the position of the projected pixel on the display surface of the display element, thus spatially separating the odd and even field images from one another. In this way, equivalent pixels are displayed on a pixel-free black matrix portion of the display surface, thus improving resolution.

FIG. 8 shows the construction of this prior art image display. The illustrated image display comprises a color liquid crystal panel (hereinafter referred to as LCD) 1 as a display element), having a backlight 1a and a color liquid crystal display element 1b, and a means including a polarization converting element 2 and a double refractor 3 disposed one in front of the other on the front surface side of the LCD 1. The LCD 1 has, for instance, one half the scanning lines of the NTSC, and as shown in a fragmentary plan view in FIG. 9, has delta arrays of R, G and B pixels. In FIG. 8, a reduced number of, i.e., several, scan lines are shown for the sake of the clarity of the drawing.

As the polarization converting element 2, a twist nematic liquid crystal shutter (hereinafter referred to as TN shutter) is usually used, which is relative inexpensive and is manufactured on the basis of an established technique. As shown in FIGS. 10(a) and 10(b), the TN shutter 2 includes a pair of polarizing members 6 having transparent electrodes 5 and a TN liquid crystal layer 7 sandwiched between the transparent electrodes 5. An AC power source 9 is connected between the pair transparent electrodes 5 via a switch 8. As shown in FIG. 10(a), with an AC voltage applied across the TN liquid crystal layer 7 by turning on the switch 8, the polarization of light incident on the polarization converting element 2 is transmitted without being rotated. As shown in FIG. 10(b), with no AC voltage applied across the TN liquid crystal layer 7 by switching off the switch 8, the polarization of the incident light is transmitted while it is rotated by 90 degrees.

The double reflector 3 is formed from an anisotropic crystal, such as rock crystal ($\alpha$-$SiO_2$), lithium niobate ($LiNbO_3$), rutile ($TiO_2$), calcite ($CaCo_3$), Chile nitre ($NaNo_3$) and $YVO_4$. As shown in FIG. 11, it transmits incident light of a first polarization as normal light, and transmits incident light of a second polarization at right angles to the first polarization as abnormal (shifted) light. Denoting the thickness of the double refractor 3 in z-axis direction perpendicular to xy coordinates of the display surface of the color LCD 1, i.e., the direction of incidence of light beam by d and the angle of separation between the normal light and abnormal light by $\theta$, the normal and abnormal light beams emitted from the double reflector 3 are spatially separated by d×tan$\theta$.

Thus, with the crystallization axis 3a of the double refractor 3 set in a suitable direction, as shown in FIG. 12, by turning off the TN shutter 2 the polarized light is rotated in the TN shutter 2 by 90 degrees and transmitted therethrough as a second polarized light, and is then transmitted through the double refractor 3 as, for instance, abnormal light. In this way, as shown in FIG. 13, the pixels of the display surface of the color LCD 1 can be observed in black matrix positions which are obliquely upwardly and rightward from their original (non-shifted) position by substantially one half pixel pitch from the original pixel positions. As shown in FIG. 14, by turning on the TN shutter 2 the polarized light from the color LCD 1 is transmitted through the TN shutter 2 without being rotated but as the input first polarized light itself, and is transmitted through the double refractor 3 as normal light. In this case, the pixels of the display surface of the color LCD 1 can be observed in their original positions as shown in FIG. 9.

In the prior art image display as shown in FIG. 8, the properties of the TN shutter 2 and the double refractor 3 are utilized such that, while odd and even field images of the input image signal are successively displayed on the same pixel of the color LCD 1 under control of an image display control circuit 11, the voltage applied to the TN shutter 2 is on-off controlled fixedly by an TN shutter drive circuit 12 which constitutes a vibrating means. Thus, pixel shifting, i.e., changing of the pixel position observed through the double refractor 3 according to the direction of polarization of light transmitted through the TN shutter 2, is obtained to improve the resolution. More specifically, in the odd field the TN shutter 2 is held "off", and, as shown in FIG. 15, the observed pixel positions are shifted obliquely upwardly and rightward by substantially one half pixel pitch from the original pixel positions (the shifted pixel positions in this case being shown as Ro, Go and Bo). In the even field the TN shutter 2 is held "on", and, as shown in FIG. 16, the original pixel positions are restored as the observed pixel positions (the pixel positions in this case being shown as Re, Ge and Be). It is thus possible to permit observation of images with double the pixel number of the color LCD 1.

For the odd and even field images displayed on the color LCD 1, the image signal is sampled at timings which are different from each other by a time corresponding to the extent of image shift. More specifically, when displaying the odd field images, the timing of sampling of the image signal is delayed to be behind the timing of when displaying the even field images by a time corresponding to substantially one half pixel pitch. Also, since the color LCD 1 holds the entire image on the display until it is re-written by the next field image, one of the pair electrodes of the TN shutter 2 is divided into a plurality of lines, for instance about 5 lines, while the other electrode is used as a common electrode. The voltage application is thus controlled by selecting the divided electrodes according to the timing of the line scanning of the color LCD 1.

However, various experiments conducted by the inventor with the prior art image display adopting the pixel shifting technique described above, reveal that when the TN shutter 2 is on-off controlled fixedly at the same timings as those of switching of the odd and even field images displayed on the color LCD 1, i.e., at an interval of 1/60 second, sufficient resolution improvement can not be obtained due to influence of the response characteristic in the rotation of the polarized light from the TN shutter 2.

FIGS. 17(a) and 17(b) are views for describing the response characteristics in the rotation of the polarized light in the TN shutter 2. Specifically, FIG. 17(a) shows the first polarized light transmittance, and FIG. 17(b) shows the drive voltage. It is assumed that a high frequency voltage is applied as the drive voltage. The TN shutter 2 has a rise response time $\tau_{ON}$ when the drive voltage is turned on and a fall response time $\tau_{OFF}$ when the drive voltage is turned off. Denoting the maximum and minimum first polarized light transmittances of the TN shutter 2 by Tm and To, respectively, the rise response time $\tau_{ON}$ is represented by the sum of a rise delay time $td_{ON}$ from the instant when the drive voltage is turned on until the instant when 10%, i. e., (To+0.1 (Tm−To)) is reached by the first polarized light transmittance after the commencement of behavior of the liquid crystal and a rise time tr from the instant of actual rising of the TN liquid crystal upon reaching of the 10% transmittance till the instant of reaching of 90% transmittance, i.e., (To+0.9(Tm−To)). The fall response time $\tau_{OFF}$, on the other hand, is represented by the sum of a fall delay time $td_{OFF}$ from the instant of commencement of the behavior of the liquid crystal when the drive voltage is turned off till the instant of transmittance fall down to 90% and a fall time td from the instant of actual falling of the TN liquid crystal upon the transmittance fall down to 90% till the instant of the transmittance fall down to 10% again.

In the above response characteristics, the values of $td_{ON}$, tr, $td_{OFF}$ and td are, for instance, $td_{ON}$=0.5 ms, tr=1 ms, $td_{OFF}$=5 ms and td=5 ms. The rise time tr depends on the applied drive voltage, while the fall time td depends on material characteristics peculiar to the liquid crystal. With the rise and fall response times $\tau_{ON}$ and $\tau_{OFF}$ being different from each other, the on-off switching of the TN shutter 2 at the same timings (the same instants) as those of the field switching, results in different transmitted light characteristics in the "on" and "off" periods of the TN shutter 2. Therefore, the residual light in the preceding field deteriorates the contrast, thus making it impossible to improve the resolution by the pixel shifting.

FIGS. 18(a) and 18(b) show the first polarized light transmittance of the TN shutter 2 and on/off timings of the drive voltage, respectively, for a single pixel of the LCD display. It will be seen that, although in the even fields only the non-shifted pixels should be transmitted to display the data thereof (i.e., image signal data Re, Ge and Be) in the original pixel positions (hereinafter also referred to as even lines), the second polarized light is also transmitted during the rise response time $\tau_{ON}$. Therefore, the first polarized light data is also displayed in the shifted pixel positions (hereinafter also referred to as odd lines), in which intrinsic data of the second polarized light (i.e., image signal data Ro, Go and Bo) are to be displayed, thus resulting in an image as shown in FIG. 19(a) which is observed. Likewise, the first and second polarized light beams are also transmitted during the fall response time $\tau_{OFF}$. Therefore, the intrinsic odd line data (i.e., image data Ro, Go and Bo) is also displayed in the even lines, thus resulting in an image as shown in FIG. 19(b) which is observed.

As a result, it is impossible to obtain sufficient improvement of the resolution by pixel shifting. In addition, due to the fact that the fall response time $\tau_{ON}$ is long compared to the rise response time $\tau_{OFF}$, a problem of contrast deterioration is posed. In the case of FIGS. 18(a) and 18(b) opposite polarity drive voltages are alternately applied to the TN shutter 2 in the successive even fields. However, it is also possible to apply a high frequency drive voltage in each voltage application period.

The calculation of the contrast will now be described with reference to FIGS. 20(a) to 20(b), which are enlarged-scale views of FIGS. 18(a) and 18(b). In FIG. 20(a), the response characteristic in the rotation of the polarized light is approximated by a straight line plot for the sake of simplifying the calculation. In FIG. 20(a), denoting the areas of the even and odd fields of the response characteristic by Se and So, respectively, the contrast Cont is given as:

$$\text{Cont}=(Se-So)/(Se+So) \quad (1)$$

Denoting the time of one field by tF, the areas Se and So are given as:

$$Se=tF-\tau_{ON}+(\tfrac{1}{2})tr \quad (2)$$

and $$So=td_{OFF}+(\tfrac{1}{2})td. \quad (3)$$

The contact Cont is thus given as:

$$\text{Cont}=(tF-\tau_{ON}-td_{OFF}+(\tfrac{1}{2})(tr-td))/(tF-\tau_{ON}+td_{OFF}+(\tfrac{1}{2})(tr+td)) \quad (4)$$

By substituting tF=16.67 ms (i.e., ⅟₆₀ s) and also the values described before in connection with FIG. 17, i.e., tr=1 ms, $td_{OFF}$=5 ms, td=5 ms and τ=1.5 ms, respectively, we have $$\text{Cont}=0.353$$

In other words, in the image display shown in FIG. 8 the contrast is reduced by about 65% due to the response characteristic of the NT shutter 2 to the rotation of the polarized light.

SUMMARY OF THE INVENTION

The present invention was made in view of the above problems inherent in the prior art, and its object is to provide an image display, which has an adequate structure for effectively preventing the deterioration of the contrast and permitting sufficient resolution improvement to be obtained by pixel shifting.

According to an aspect of the present invention, there is provided an image display comprising a display element having a display surface with a regular array of a plurality of pixels, a pixel shifting means for shifting an optical axis of a light beam emitted from the display surface in a predetermined direction, and an image display control means for causing display of different images on the display element in synchronism to the shifting of the optical axis caused by the pixel shifting means, wherein the pixel shifting means includes a polarization conversion control means capable of controlling polarization conversion timings.

The polarization conversion control means includes a polarization conversion element and a driving means for driving the polarization conversion element according to a response characteristic thereof. The driving means is capable of setting both the timing of switching the "on" times of drive signals for transmitting a first and a second polarized light beams (i.e., the rotated and non-rotated beams) to the polarization conversion element and the ratio between the two "on" times. The drive signal switching timing and the time ratio are set such that the transmitted doses of the first and second polarized light beams at the time of the polarization conversion are substantially 50%. The driving means includes a plurality of delayed signal generators for generating delayed signals according to a synchronizing signal of image displayed on the display element.

According to another aspect of the present invention, there is provided an image display which includes display element means having a display surface with a plurality of pixels and polarization converting means opposed to the display element means for rotating a light beam emitted from the display surface in a predetermined direction in response to a drive signal, and shifts an optical axis of the light beam in a predetermined direction and successively displays on the same image pixel images of an odd field and a even field, wherein the drive signal is determined on the basis of a response characteristic of the polarization converting means.

The "on" times of the drive signals for transmitting a first and a second polarized light beams from the polarization conversion means and the time ratio between the two "on" times are settable. The switching timing and the time ratio by the drive signal are set such that the transmitted doses of the first and second polarized light beams at the time of the polarization conversion are substantially 50%.

According to other aspect of the present invention, there is provided an image display which includes display element means having a display surface with a plurality of pixels, and polarization converting means for rotating a light beam emitted from the display surface in a predetermined direction in response to a drive signal and a double refractor disposed one in front of the other on the front surface side of the display element means, and successively displays on the same image pixel images of an odd field and a even field, wherein the drive signal is determined on the basis of a response characteristic of the polarization converting means and the image pixel positions observed via the double refractor are shifted.

The polarization converting means is on-off controlled such that at the time of the switching of fields the first and second polarized light transmittance are substantially 50% when one image pixel is considered. The on-off timings and duty ratio of the drive signal are determined. The polarization conversion means is TN shutter having a short rise response time compared to the fall response time. The display element is color LCD, monochromatic LCD, plasma display, EL or photochromics. The display element has a delta array, stripes arrays or mosaic arrays, and the image position shift by the wobbling is obtained through interpolation in conformity to the image pixel array. The image display further comprises temperature detector for detecting the temperature in the neighborhood of the polarization converting means and control means for controlling the on-off timings of the drive signal and the duty ratio on the basis of the detected temperature.

Other objects and features will be clarified from the following description with reference to attached drawings.

BRIEF DESCRIPTION OF THE DRAWINGS

FIG. 1 shows a construction of an embodiment of the image display according to the present invention;

FIGS. 2 (a) to 2(e) show signal waveforms for describing the operation of TN shutter driving means;

FIGS. 3a) and 3(b) show timing relationships of the first polarized light transmittance of the TN shutter 2 and the drive voltage;

FIGS. 4(a) and 4(b) show enlarged-scale views of FIGS. 3(a) and 3(b);

FIGS. 17(a) and 17(b) are views for describing the response characteristics in the rotation of the polarized light in the TN shutter in FIG. 8;

FIGS. 18(a) and 18(b) show the first polarized light transmittance of the TN shutter and on/off timings of the drive voltage, respectively;

FIGS. 20(a) to 20(b) show enlarged-scale views of FIGS. 18(a) and 18(b).

PREFERRED EMBODIMENTS OF THE INVENTION

Figure 5:
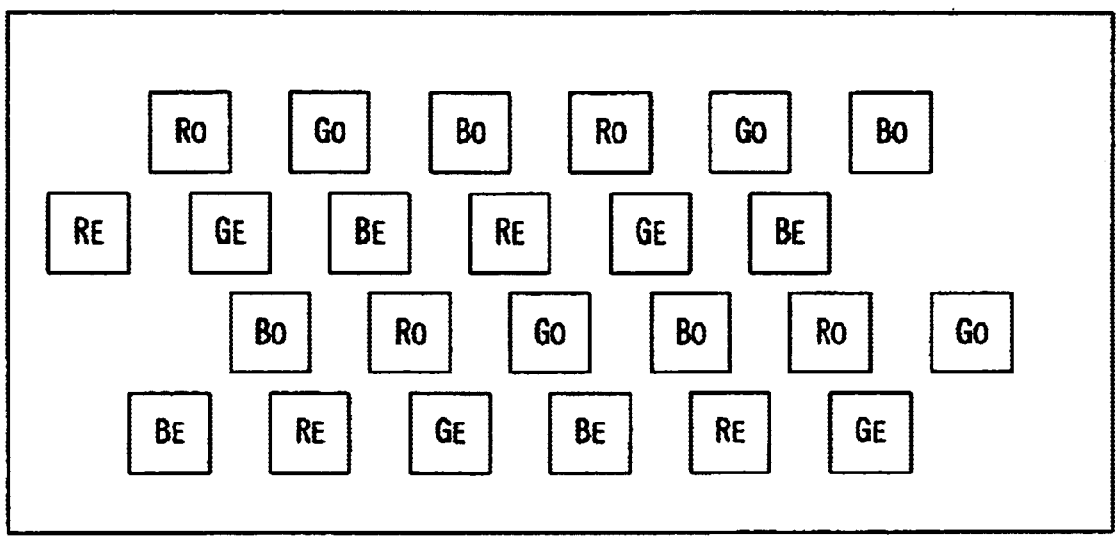
FIG. 5 shows observed image pixels of display surface of the color LCD in the embodiment of FIG. 1.

Preferred embodiments of the present invention will now be described with reference to the drawings.

FIG. 1 shows the construction of an embodiment of the image display according to the present invention. This image display, like the one shown in FIG. 8, comprises a color LCD 1 as a display element, having a backlight 1a and a color liquid crystal display element 1b, and a polarization converting element including a TN shutter 2 and a double refractor 3 disposed one ahead of the other on the front surface side of the color LCD 1. Like the prior art image display as described before, odd and even field images of the input image signal are successively displayed on the same pixel under control of an image display control circuit 11.

In this embodiment, the image display control circuit 11 supplies a synchronizing signal of the image signal to a TN shutter drive means 21, and under control of this synchronizing signal the TN shutter drive means 21 on-off controls the TN shutter 2 according to the response characteristic in the rotation of the polarized light for pixel shifting, i.e., changing the pixel positions observed via the double refractor 3 according to the direction of rotation of the polarized light transmitted through the TN shutter 2. To this end, the TN shutter drive means 21 includes a field detector 22, delayed signal generators 23 and 24 and a TN shutter drive signal generator 25. The field detector 22 produces a field synchronizing signal as shown in FIG. 2(a) under control of the synchronizing signal from the image display control circuit 11. The delayed signal generators 23 and 24 delay the field synchronizing signal by different times τ1 and τ2 as shown in FIGS. 2(b) and 2(c), respectively. The TN shutter drive signal generator 25 generates a TN shutter drive signal as shown in FIG. 2(d) by using the outputs of the delayed signal generators 23 and 24 as, for instance, a set signal and a reset signal, respectively, and applies a drive voltage as shown in FIG. 2(e) to the TN shutter 2 in synchronism to the TN shutter drive signal thus generated. While in the case of FIGS. 2(a) to 2(e) opposite polarity DC drive voltages are applied alternately in the successive even fields, it is also possible to apply a high frequency drive voltage in each voltage application period.

FIGS. 3(a) and 3(b) show timing relationships of the first polarized light transmittance of the TN shutter 2 and the drive voltage, respectively, when one pixel is considered. As shown, the TN shutter 2 is on-off controlled such that at the time of the switching of fields the first polarized light transmittance is substantially 50%, that is, the second polarized light transmittance is also substantially 50%. As shown in FIGS. 4(a) and 4(b), which are enlarged-scale views of FIGS. 3(a) and 3(b), the time tb from the instant when the drive voltage is turned on till the instant of the switching of fields and the duty ratio df are set such as to meet the relations:

$$tb = td_{ON} + tr/2 \quad (5)$$

and $$df = (tF + (td_{ON} - td_{OFF}) + (tr - td))/2/(2 \cdot tF) \quad (6)$$

Thus, the delay time 1 and 2 provided by the delay signal generators 23 and 24 as shown in FIG. 1, are controlled such as to meet relations:

$$\tau 1 = tF - td_{ON} - (\tfrac{1}{2})tr \quad (7)$$

and $$\tau 2 = 2tF - td_{OFF} - (\tfrac{1}{2})td \quad (8)$$

With these controls, the even and odd field areas Se and So shown in FIG. 4(a) are $$Se = tF - (\tfrac{5}{32})tr - (\tfrac{5}{32})td \quad (9)$$

and $$So = (\tfrac{5}{32})tr + (\tfrac{5}{32})td \quad (10)$$

The contrast Cont is thus $$Cont = (16tF - 5(tr + td))/(16tF) \quad (11)$$

Substitution of tF=16.67 ms (1/60 s) and the values of tr and td as described before in connection with FIG. 17 into the above equation (11) thus yields $$Cont = 0.8875$$

Figure 8:
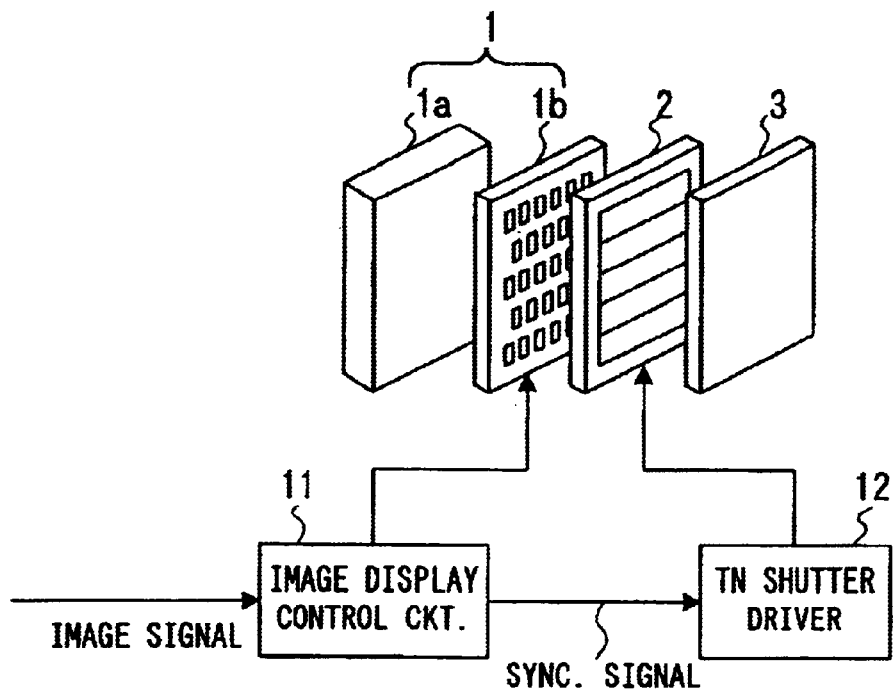
FIG. 8 shows a construction of this prior art image display.
Figure 9:
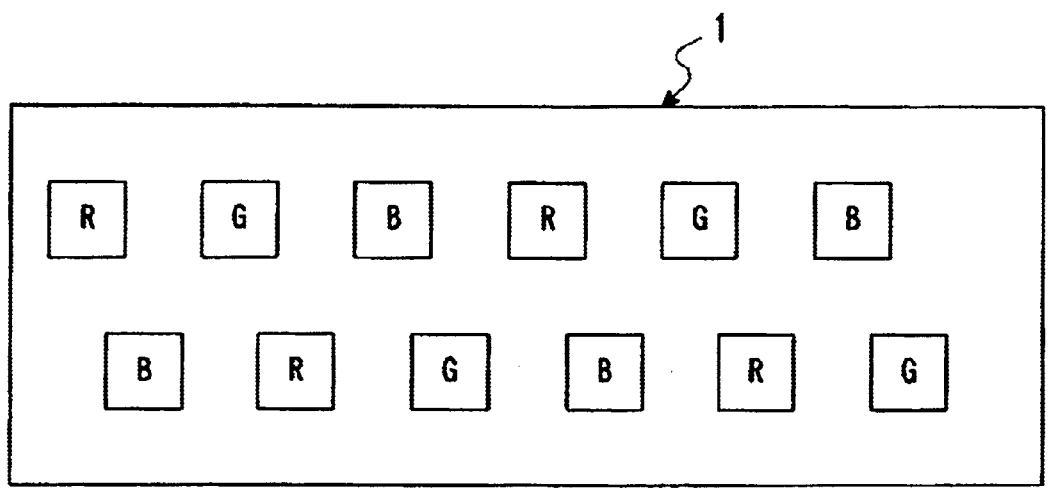
FIG. 9 shows a partial plan view representing image pixel arrangement of the color LCD shown in FIG. 8.
Figure 10:
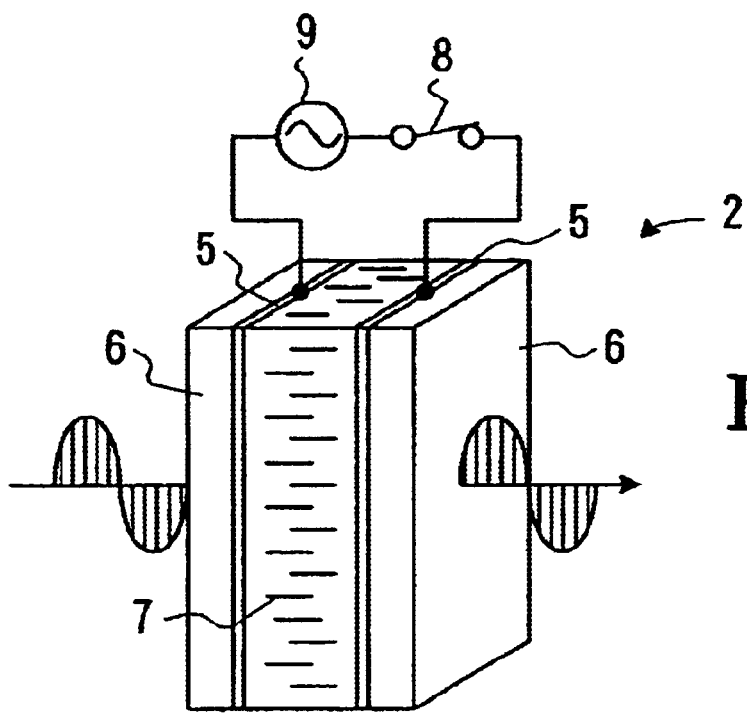
FIGS. 10(a) and 10(b) drawings for describing the operation of the TN shutter shown in FIG. 8.
Figure 10:
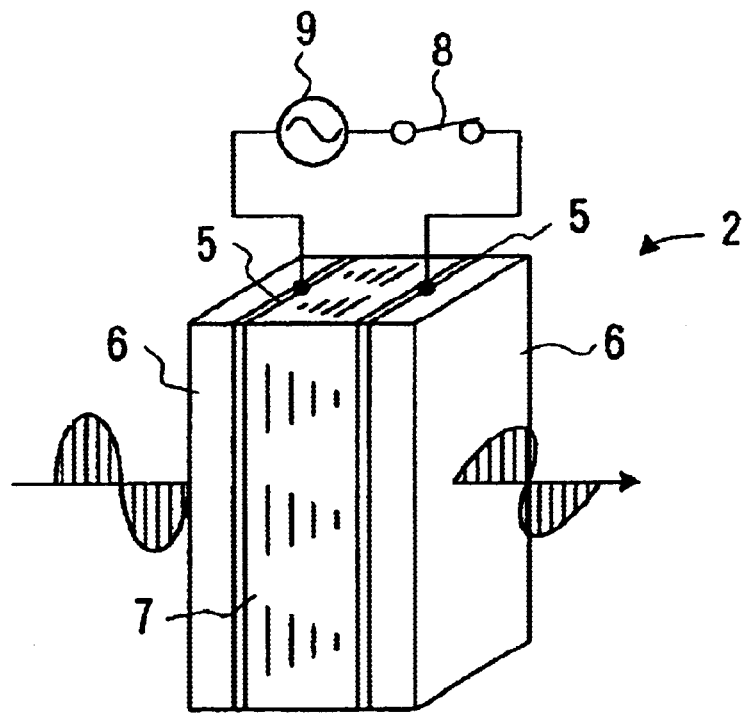
Figure 11:
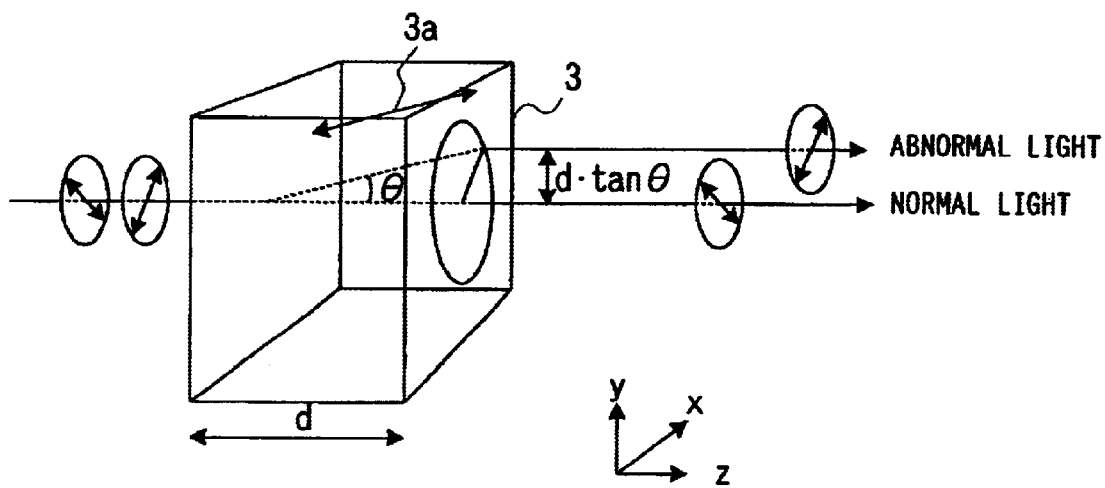
FIG. 11 shows a drawing for describing the operation of double refractor.
Figure 12:
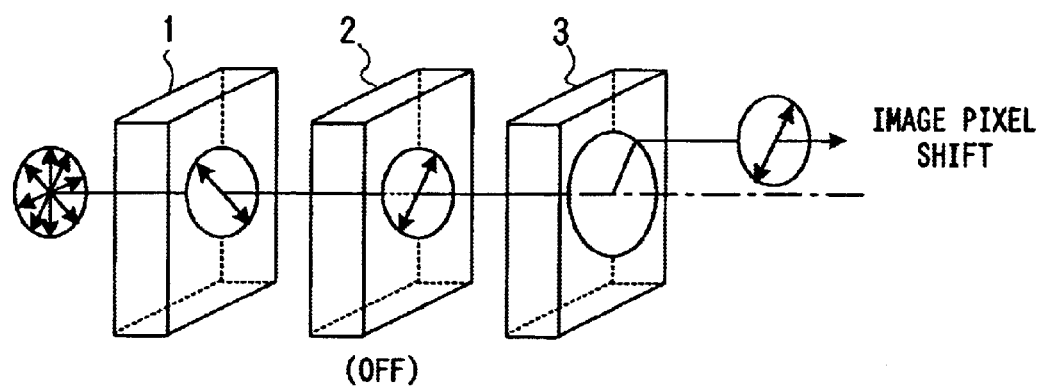
FIG. 12 shows a drawing illustrating the polarization for the image pixel shift in a prior art image display.
Figure 13:
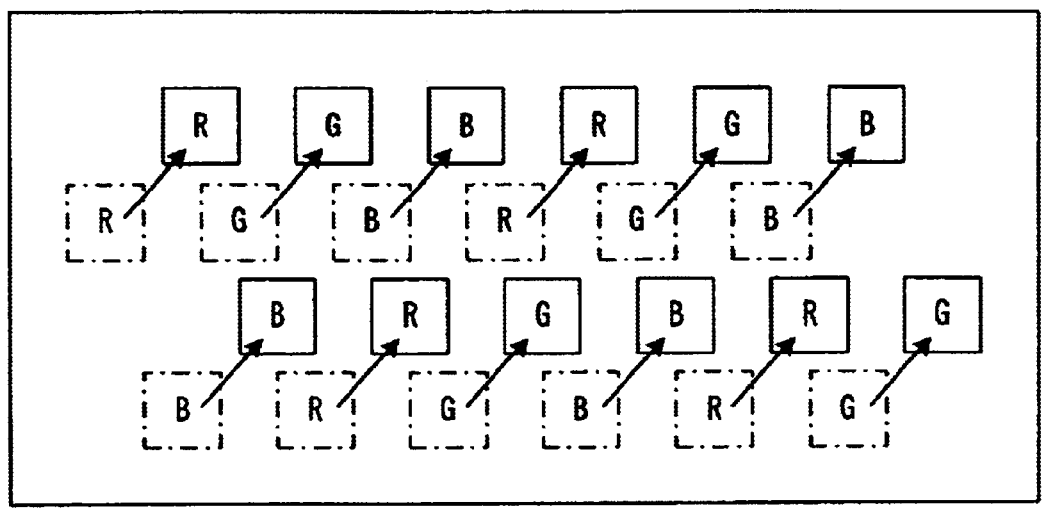
FIG. 13 shows observed image pixel positions in the image pixel shift state.
Figure 14:
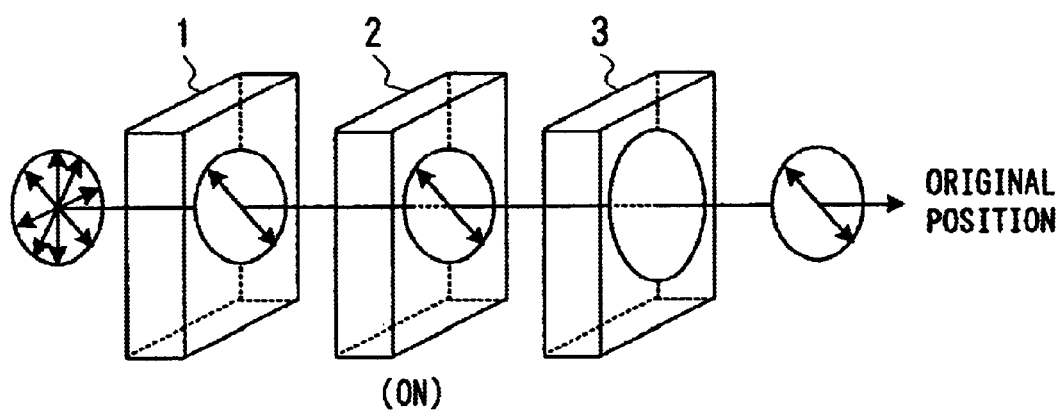
FIG. 14 shows a drawing illustrating the polarization without image pixel shift in the prior art image display.
Figure 15:
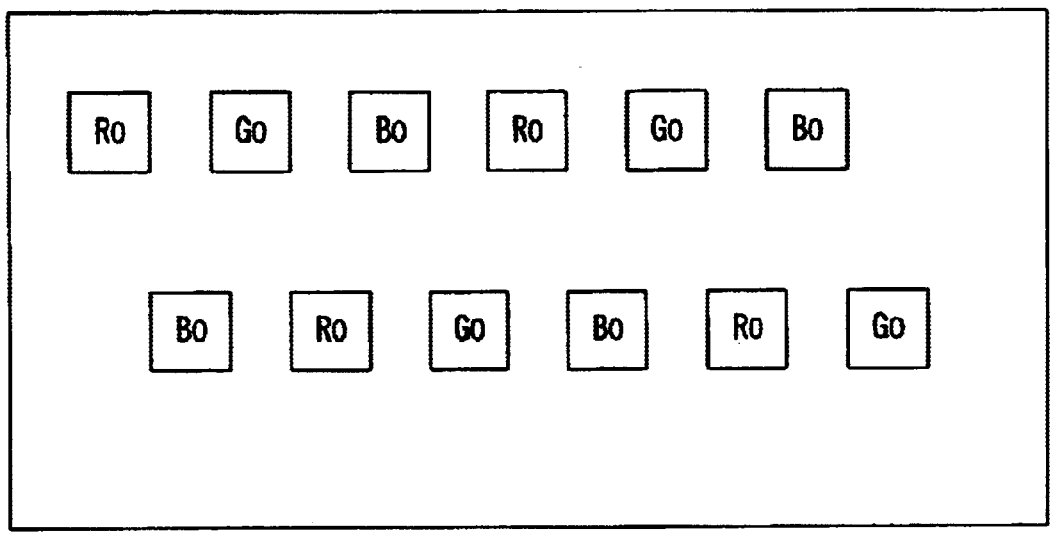
FIG. 15 shows the observed image pixel in the odd field in the prior art image display.
Figure 16:
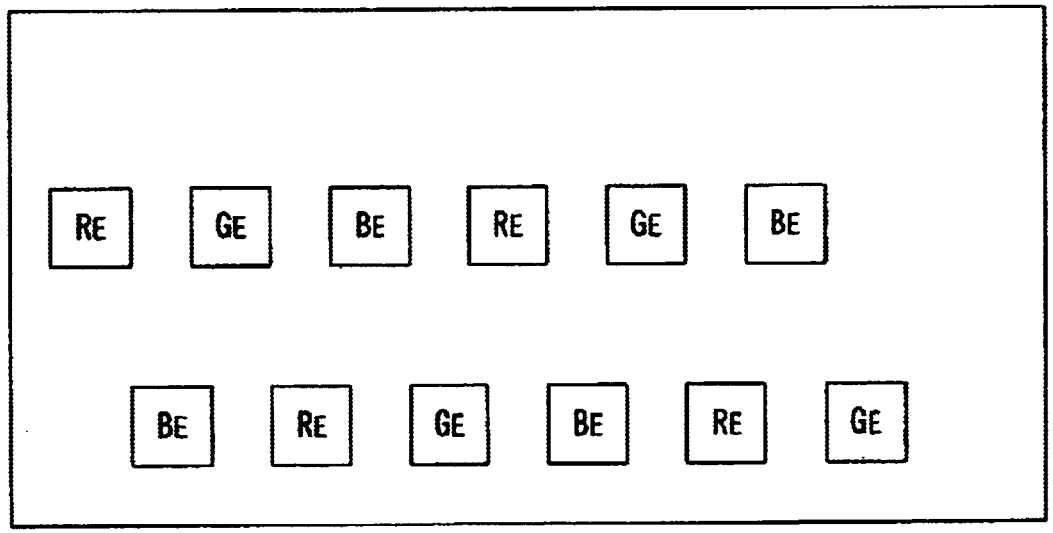
FIG. 16 shows the observed image pixel in the even field in the prior art image display.
Figure 19A:
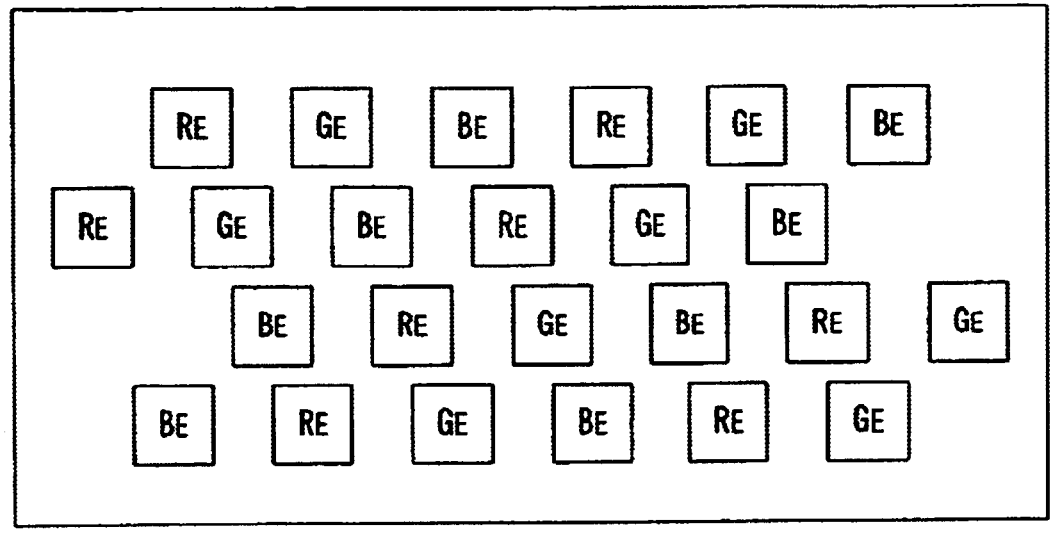
FIGS. 19(a) and 19(b) show drawings for describing problems to be solved in the prior art image display.
Figure 19B:
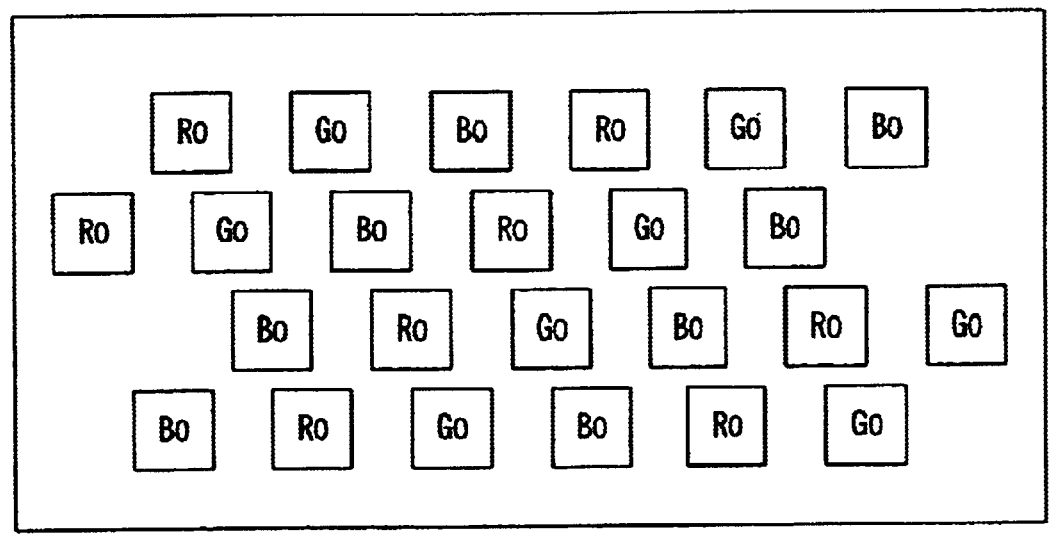

This value indicates that it is possible to improve the contrast by about 53% compared to the prior art image display shown in FIG. 8.

In addition, by driving the TN shutter 2 in the above way, it is possible to minimize the simultaneous display of the same image signal in both the odd and even lines. As shown in FIG. 5. Thus, in the odd fields the odd field image signal data of Ro, Go and Bo can be effectively displayed in the odd lines provided as a result of the pixel shift, while displaying the even field image signal data of Re, Ge and Be in the even lines as the original pixel positions in the even fields. It is thus possible to obtain sufficient resolution improvement by wobbling.

As has been shown, in this embodiment the timing of turning on and off the drive voltage and the duty ratio are controlled according to the response characteristic of the TN shutter 2 in the rotation of the polarized light such that the first and second polarized light transmittances are substantially 50% at the instant of the switching of fields. It is thus possible to maximize the contrast, effectively improve the resolution and permit observation of high resolution and excellent quality images. In the above embodiment, the TN shutter 2, the double refractor 3 and the TN shutter driving means 21 constitute a pixel shifting means, and the TN shutter 2, the field detector 22, the delayed signal generators 23 and 24 and the TN shutter drive signal generators 25 constitute a polarization conversion control means. Furthermore, the TN shutter constitutes a polarization conversion element, and the field detector 22, the delayed signal generators 23 and 24 and the TN shutter drive signal generator 25 constitutes a drive means.

Figure 6:
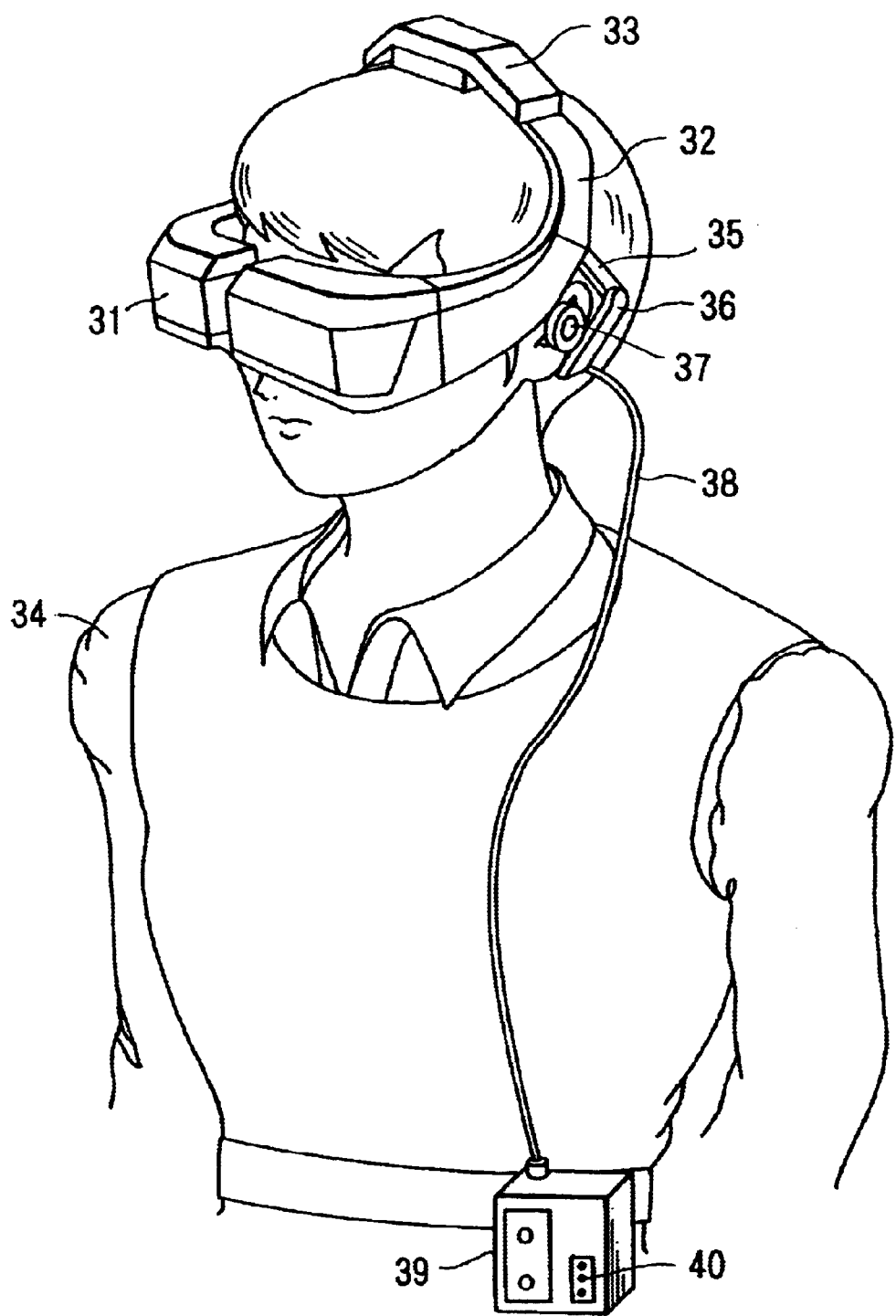
FIG. 6 shows an example of head-mounted display in which the image display shown in FIG. 1 is mounted.

FIG. 6 shows an example of head-mounted display (hereinafter referred to as HMD), in which the image display shown in FIG. 1 is mounted. The HMD comprises a display body part 31, a side frame 32 and a top frame 33. The display body part 31 is held in front of the face of the observer 34 by mounting the side frame 32 and the top frame 33 on the head of the observer 34. The HMD further comprises a rear frame 36 mounted via a leaf spring 35 on the side frame 32, and a loudspeaker 37 provided on the rear frame 36 at a position thereof corresponding to the position of an ear of the observer 34.

Figure 7A:
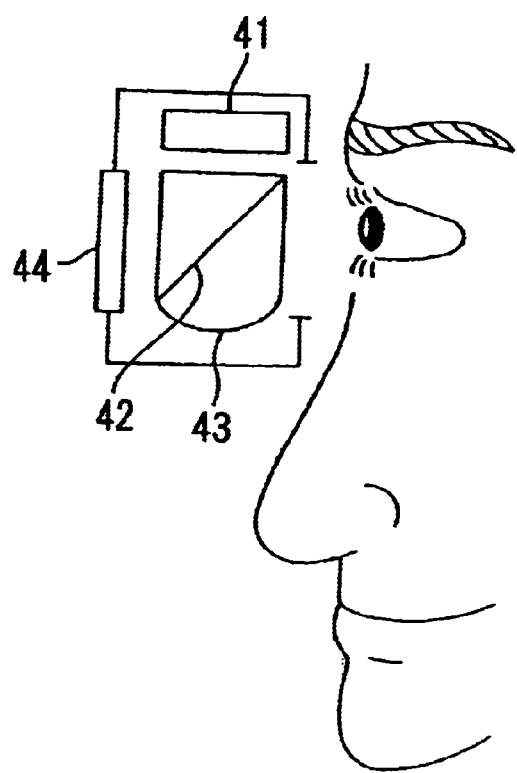
FIG. 7(a) or 7(b) show two examples of optical systems to be provided in the display body part corresponding to left and right eyeballs in the head-mounted display.
Figure 7B:
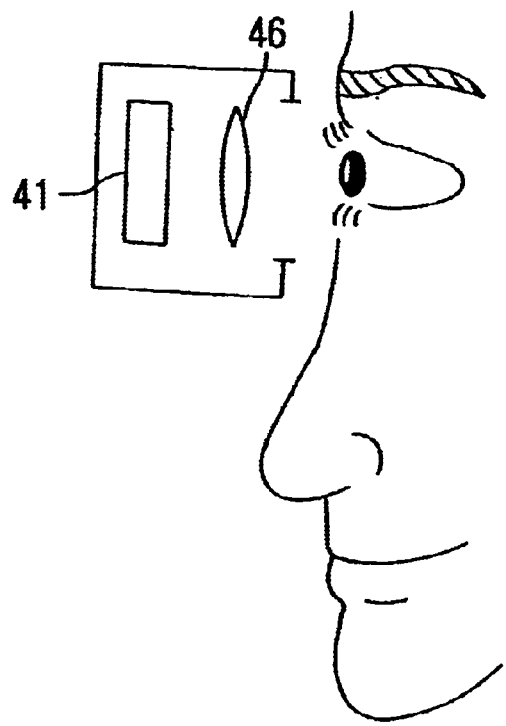

The display body part 31 includes an optical system as shown in FIG. 7(a) or 7(b), which is provided at a position in correspondence to each eyeball of the observer 34. The optical system shown in FIG. 7(a) is of a see-through type. As shown, a display image from the image display 41 comprising the color LCD, the TN shutter and the double refractor as shown in FIG. 1, is transmitted through a half mirror prism 42, then reflected by a convex mirror 43 and then reflected by the half mirror prism 42 to be led on an enlarged scale to the corresponding eyeball, while external image is led through, for instance, a liquid crystal shutter 44 and the half mirror prism 42 to the corresponding eyeball. The optical system shown in FIG. 7(b) is adapted such as to lead a display image from the image display 41 having the construction as shown in FIG. 1 through an eyepiece lens 46 to the corresponding eyeball.

The display body part 31 is connected via a cable 38 to a player 39 having a volume control means 40 for controlling the level of a voice signal or the like. A given image signal is supplied from the player 39 to a left and a right image display, and the voice signal is outputted form the loudspeaker 37.

The display body part 31 can be connected via the cable 38 to an existing video deck or TV tuner for displaying images thereon. Alternatively, it may be connected to a computer or the like for displaying computer graphics images or message video from the computer. As a further alternative, without the cable 38 the display body part 31 may be provided with an antenna for radio receiving and displaying the received image signals. As a still further alternative, it is possible to permit observation of stereo images displayed on the left and right image displays by supplying image signals providing a parallax to the image displays.

In the HMD as described, the color LCD constituting the image display is as small as, for instance, 1.3 inches and has at most 300,000 pixels. With such a color LCD the pixel shifting as described above is very effective for obtaining high resolution and high image quality in a wide angle HMD.

The above embodiment of the present invention is by no means limitative, and various changes and modifications are possible. For example, while the above embodiment used as the polarization conversion element a TN shutter having a short rise response time compared to the fall response time, in the case of using a TN shutter having the opposite characteristic or in the case of using a polarization conversion element other than a TN shutter, it is possible to prevent deterioration of the contrast and improve the resolution by controlling the drive timings and the duty ratio such as to compensate the difference between the rise and fall response times. It is also easily understandable that other intervals (time periods) than 1/60 second may be used as the 1 field time period. In addition, the display element is not limited to the color LCD, but the present invention also finds effective applications to cases of using monochromatic LCDs or color or monochromatic display elements such as plasma displays, ELs and photochromics. Furthermore, the pixel array in the display element is not limited to the delta array, but it is also possible to adopt other arrays such as stripes arrays and mosaic arrays, and image shift by pixel shifting is obtainable by interpolating the black matrix in conformity to the pixel array.

Still further, while in the above embodiment the image shift was executed with the TN shutter 2 in the "off" state, it is also possible to effect the image shift in the "on" state of the TN shutter 2 by causing 90-degree rotation of the direction of polarization of the polarizer in the color LCD 1. Moreover, for coping with changes in the response characteristic of the TN shutter 2 with ambient temperature changes, it is possible to detect the temperature in the neighborhood of the TN shutter 2 and control the on-off timings of the drive voltage applied to the TN shutter 2 and the duty ratio according to the detected temperature. By so arranging, it is possible to permit observation of high resolution and high quality images at all times irrespective of ambient temperature changes.

As has been described in the foregoing, according to the present invention the pixel shifting means for effecting the pixel shifting includes a polarization conversion control means capable of controlling the timings of the polarization conversion, and it is thus possible to drive the pixel shifting means according to the response characteristic thereof, thus effectively preventing the deterioration of the contrast and obtaining sufficient resolution improvement by the pixel shifting.

What is claimed is:

1. An image display comprising a display element having a display surface with a regular array of a plurality of pixels, a pixel shifting means for pixel shifting an optical axis of a light beam emitted from the display surface in a predetermined direction, and an image display control means for causing display of different images on the display element in synchronism to the shifting of the optical axis caused by the pixel shifting means, the pixel shifting means having a given response characteristic and including a polarization conversion control means which controls timings at which polarization conversion takes place, said polarizing conversion control means controlling the timing as a function of the response characteristic of the pixel shifting means.

2. The image display means according to claim 1, wherein the polarization conversion control means includes a polarization conversion element and a driving means for driving the polarization conversion element according to the response characteristic thereof.

3. The image display according to claim 2, wherein the driving means sets the timing and duty cycles of drive signals applied to the polarization conversion element to control the transmission of first and second polarized light beams through the polarization conversion element.

4. The image display according to claim 3, wherein the driving means controls the drive signals so the first and second polarized light beam transmittances are approximately 50% at the time the polarization conversion takes place.

5. The image display according to one of claims 2 and 3, wherein the driving means includes a plurality of delayed signal generators for generating delayed signals according to a synchronizing signal of image displayed on the display element.

6. An image display which includes display element having a display surface with a plurality of pixels and polarization converting means opposed to the display element for rotating a light beam emitted from the display surface in a predetermined direction in response to a drive signal, and shifts an optical axis of the light beam in a predetermined direction and successively displays on the same image pixel images of an odd field and a even field, said polarization converting means having a given response characteristic, wherein the drive signal is determined on the basis of the response characteristic of the polarization converting means.

7. The image display according to claim 6, wherein "on" times of the drive signals for transmitting a first and a second polarized light beams from the polarization conversion means and the time ratio between the two "on" times are settable.

8. The image display according to claim 7, wherein switching timing and the time ratio by the drive signal are set such that the transmitted doses of the first and second polarized light beams at the time of the polarization conversion are substantially 50%.

9. An image display which includes display element having a display surface with a plurality of pixels, and polarization converting means for rotating a light beam emitted from the display surface in a predetermined direction in response to a drive signal and a double refractor disposed in front of the polarization converting means on the front surface side of the display element, the image display successively displaying the same image pixel image of an odd field and a even field, said polarization converting means having a given response characteristic, the drive signal being determined on the basis of the response characteristic of the polarization converting means, the image pixel positions observed via the double refractor being shifted as a function of the odd and even fields of the image display.

10. The image display according to claim 9, wherein the polarization converting means is on-off controlled such that at the time of the switching of fields the first and second polarized light transmittance are substantially 50% when one image pixel is considered.

11. The image display according to claim 10, wherein the on-off timings and duty ratio of the drive signal are determined as a function of the response characteristics of the polarization converting means.

12. The image display according to claim 9, wherein the polarization conversion means is TN shutter having a short rise response time compared to its fall response time.

13. The image display according to claim 9, wherein the display element is color LCD, monochromatic LCD, plasma display, EL or photochromics.

14. The image display according to claim 9, wherein the display element has a delta array, stripes arrays or mosaic arrays, and the image position shift by the wobbling is obtained through interpolation in conformity to the image pixel array.

15. The image display according to claim 9, further comprising temperature detector for detecting the temperature in the neighborhood of the polarization converting means and control means for controlling the on-off timings of the drive signal and the duty ratio on the basis of the detected temperature.

16. An image display, comprising:
   a display element having an array of pixels and generating light beams at selected ones of the pixels as a function of an image signal applied thereto;
   a polarization element for selectively shifting the optical axis of the light beams, as a function of a control signal applied thereto, the polarization element having a delayed response characteristic; and
   a signal generator for generating the control signal as a function of the delayed response characteristic of the polarization element.

17. An image display according to claim 16, wherein the polarization element comprises a TN shutter.

18. An image display according to claim 16, wherein the polarization element further comprises a double refractor, the TN shutter being located between the display element and the double refractor.

19. An image display according to claim 16, wherein the control signal is a drive signal which switches between an on and an off condition and wherein the signal generator controls the timing and duty cycle of the drive signal as a function of the delayed response characteristic of the polarization element.

20. An image display according to claim 19, wherein the drive signal is controlled in a manner which enhances the contrast of the image display.

21. An image display according to claim 19, wherein the image display generates first and second image fields and the polarization element is operable in first and second states in response to the drive signal, the optical axis of the light beams generated by the display element being different when the polarization element is operated in the first and second states.

22. An image display according to claim 21, wherein the signal generator controls the timing and duty cycle of the drive signal to ensure that the transmittances of the light beams from the image display are at substantially 50% at the time the polarization element switches between the first and second states.

23. An image display according to claim 19, wherein the image display generates a plurality of image fields and the polarization element is operable in a plurality of states in response to the drive signal, the optical axis of the light beams varying as a function of the state in which the polarization element is operated.

24. An image display according to claim 23, wherein the signal generator controls the timing and duty cycle of the drive signal to ensure that the transmittances of the light beams from the image display are at substantially 50% at the time the polarization element switches between states.

25. An image display according to claim 16, wherein the polarization element is a TN shutter having a short rise response time compared to its fall response time.

26. An image display according to claim 16, wherein the polarization element is a TN shutter having different rise and fall response times.

27. An image display according to claim 16, wherein the display element is chosen from the group a color LCD, monochromatic LCD, plasma display EL or photochromics.

28. An image display according to claim 16, further including a temperature detector which detects the temperature in the neighborhood of the polarization converting means and wherein the signal generator generates the control signal as a function of both the response characteristic of the polarization element and the detected temperature.

* * * * *